US008798362B2

(12) United States Patent
Wang et al.

(10) Patent No.: US 8,798,362 B2
(45) Date of Patent: Aug. 5, 2014

(54) CLOTHING SEARCH IN IMAGES (75) Inventors: Xianwang Wang, Palo Alto, CA (US); Tong Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 136 days.

(21) Appl. No.: 13/209,901

(22) Filed: Aug. 15, 2011

(65) Prior Publication Data
US 2013/0044944 A1   Feb. 21, 2013

(51) Int. Cl.
*G06K 9/00*   (2006.01)
*G06K 9/34*   (2006.01)

(52) U.S. Cl.
USPC ........................................................ 382/165

(58) Field of Classification Search
CPC ...... G06K 9/4652; G06K 9/6211; G06T 7/40; G06T 7/401; G06T 7/408
USPC ......... 382/103, 108, 115–118, 162, 164, 165, 382/173, 181, 195, 199, 218–220; 348/222.1, 223.1, E05.031; 345/158
See application file for complete search history.

(56) References Cited

U.S. PATENT DOCUMENTS

| | | | |
|---|---|---|---|
| 6,751,343 B1 | 6/2004 | Ferrell et al. | |
| 7,024,020 B2 * | 4/2006 | Lee et al. | 382/103 |
| 7,864,989 B2 | 1/2011 | Song et al. | |
| 8,180,112 B2 * | 5/2012 | Kurtz et al. | 382/108 |
| 8,306,281 B2 * | 11/2012 | Matsubara et al. | 382/118 |
| 8,379,920 B2 * | 2/2013 | Yang et al. | 382/103 |
| 2009/0027337 A1 * | 1/2009 | Hildreth | 345/158 |
| 2009/0116698 A1 | 5/2009 | Zhang et al. | |
| 2010/0030663 A1 | 2/2010 | Wannier et al. | |
| 2010/0067745 A1 | 3/2010 | Kovtun et al. | |
| 2010/0082614 A1 | 4/2010 | Yang et al. | |
| 2010/0271395 A1 | 10/2010 | Isogai et al. | |
| 2011/0292232 A1 * | 12/2011 | Zhang et al. | 348/222.1 |
| 2012/0201468 A1 * | 8/2012 | Oami et al. | 382/199 |

FOREIGN PATENT DOCUMENTS

KR   20100071822   6/2010

OTHER PUBLICATIONS

Yamamoto, et al., "Fast Face Clustering Based on Shot Similarity for Browsing Video," Progress in Informatics, No. 7, pp. 53-62, Published: Mar. 2010, retrieved from http://www.nii.ac.jp/pi/n7/7_53.pdf.
Hsu, et al., "Video Search Reranking via Information Bottleneck Principle," MM'06, Santa Barbara, California, USA, Published: Oct. 23-27, 2006, retrieved from http://www.ee.columbia.edu/~lyndon/pubs/acmmm2006-rerank.pdf, 10 pages.

(Continued)

*Primary Examiner* — Amir Alavi (57) ABSTRACT

Methods, systems, and computer readable media with executable instructions, and/or logic are provided for clothing search in images. An example method of clothing search in images can include characterizing clothing within a plurality of reference images using a processor, and characterizing clothing within a query image using a processor. A number of the plurality of reference images having clothing with similar color features as clothing of the query image is identified using a processor. A subset of the identified number of the plurality of reference images having clothing with predefined non-color attributes as clothing of the query image are selected using a processor.

15 Claims, 4 Drawing Sheets

(56) References Cited

OTHER PUBLICATIONS

Liu, et al., "Optimizing Video Search Reranking Via Minimum Incremental Information Loss," ACM Multimedia Information Retrieval 2008, Vancouver, BC, Canada, Published: Oct. 2008, retrieved from http://www.ismll.uni-hildesheim.de/lehre/semML-09s/script/p253-liu.pdf, pp. 253-259.

A.C. Gallagher and T. Chen, "Clothing cosegmentation for recognizing people," in Computer Vision and Pattern Recognition, Jun. 2008, pp. 1-8.

H. Chen, Z. Xu, Z. Liu, and S. Zhu, "Composite templates for cloth modeling and sketching," in IEEE Conference on Computer Vision and Pattern Recognition, vol. 1, No. 8, Jun. 2006, pp. 943-950.

Y. Song and T. Leung, "Context-aided human recognition: Clustering," in European Conference on Computer Vision, May 2006, pp. 382-395.

D. Anguelov, K. Lee, S.B. Gokturk, and B. Sumengen, "Contextual identity recognition in personal photo albums," in Computer Vision and Pattern Recognition, Jun. 2007, pp. 1-7.

Y.Tian, W. Liu, R. Xiao, F. Wen, and X. Tang, "A face annotation framework with partial clustering and interactive labeling," in Computer Vision and Pattern Recognition, Jun. 2007, pp. 1-8.

L. Zhang, Y. Hu, M. Li, W. Ma, and H. Zhang, "Efficient propagation for face annotation in family albums," in ACM intl. Conf. on Multimedia, Oct. 2004, pp. 716-723.

M.J. Jones and P. Viola, "Fast multi-view face detection," in Computer Vision and Pattern Recognition, Jun. 2003.

C. Rother, V. Kolmogorov, and A. Blake, "Grabcut—interactive foreground extraction using iterated graph cuts," SIGGRAPH, vol. 23, pp. 309-314, Aug. 2004.

P. Yogarajah, J. Condell, K. Curran, A. Cheddad, and P. McKevitt, "A dynamic threshold approach for skin segmentation in color images," in International Conference on Image Processing, Sep. 2010, pp. 2225-2228.

D.G. Lowe, "Distinctive image features from scale-invariant keypoints," International Journal of Computer Vision, vol. 60, pp. 91-110, Nov. 2004.

K.E.A. van de Sande, T. Gevers, and C.G.M. Snoek, "Evaluating color descriptors for object and scene recognition," Pattern Analysis and Machine Intelligence, No. 9, pp. 1582-1596, Oct. 2010.

A. Borras, F. Tous, et al., "High-Level Clothes Description Based on Colour-Texture and Structural Features," Pattern Recognition and Image Analysis, vol. 2652, pp. 108-116, Jun. 2003.

C. Tseng, S. Hung, et al., "An efficient garment visual search based on shape context", WSEAS Trans. on Comp., Issue 7, vol. 8, No. 10, pp. 1195-1204, Jul. 2009.

Tong Zhang, "Intelligent keyframe extraction for video printing," ITCom'04 Conference on Internet Multimedia Management Systems, vol. 5601, p. 25-35, Philadelphia, Oct. 2004.

Tong Zhang, Jun Xiao, Di Wen, Xiaoqing Ding, "Face based image navigation and search," ACM Conference on Multimedia, Beijing, pp. 597-600, Oct. 2009.

Yuan, Shuai., "A System of Clothes Matching for Visually Impaired Persons", Published: Oct. 2010, retrieved from http://delivery.acm.org/10.1145/1880000/1878883/p303-yuan.pdf?key1=1878883&key2=3327710031&coll=DL&dl=ACM&ip=203.8.109.15&CFID=12291865&CFTOKEN=34540084, pp. 303-304.

Chao, et al., "A Framework for Robust Feature Selection for Real-time Fashion Style Recommendation", IMCE'09, Oct. 23, 2009, Beijing, China, retrieved from http://delivery.acm.org/10.1145/1640000/1631047/p35-chao.pdf?key1=1631047&key2=6852810031&coll=DL&dl=ACM&ip=203.8.109.15&CFID=12460163&CFTOKEN=98519841, pp. 35-42.

Y. Jing and S. Baluja, "VisualRank: Applying PageRank to Large-Scale Image Search", IEEE Trans. Pattern Analysis and Machine Intelligence, vol. 30, No. 11, pp. 1-14, Nov. 2008.

L. Xie, A. Natsev, et al., "Dynamic Multimodal Fusion in Video Search", IEEE Conf. on Multimedia and Expo, pp. 1499-1502, Jul. 2007.

Kumar, et al., "Attribute and Simile Classifiers for Face Verification," Columbia University, retrieved from http://www.cs.columbia.edu/~belhumeur/conference/iccv09.pdf, retrieved on Aug. 18, 2011, 8 pages.

J. Liu and W. Lai, et al., "Video Search Re-Ranking via Multi-Graph Propagation", ACM Conf. on Multimedia, pp. 208-217, Sep. 2007.

* cited by examiner

CLOTHING SEARCH IN IMAGES

BACKGROUND

With increasing Internet data transfer speeds and the prosperity of WEB 2.0, the amount of image data on the Internet is ever-growing. Image-based websites, such as FLICKR®, PICASA®, YOU-TUBE®, etc., are growing in popularity, making online content-based image management more important than ever. Since new image data is being uploaded to the Internet all the time, how to efficiently organize, index, and retrieve desired image data is a constant challenge. One particular challenge is finding images with a similar characteristic, such as including similar visual subject matter. Word-based searches for clothing are not effective if the clothing is not described in metadata associated with the image.

Searching for similar clothes in photo collections is non-trivial as the photos are usually taken under completely uncontrolled environment. The clothes portion of visual images can have large variations such as geometric deformation, occlusion, size, background, and photometric variability from illumination and pose, which cause significant interference on clothes retrieval. These variations can impact similarly categorizing image data of subjects wearing similar clothing, and hinder retrieval based on the similar clothing. Similar clothing can help identify images of a particular person who wears the clothing such as in family photo collections, in security applications such as tracking an individual across a number of camera installations, in electronically shopping for the clothing, for searching to find a celebrity wearing certain clothing, and numerous other applications. As such, an improved methodology of clothing search in images can be beneficial.

DETAILED DESCRIPTION

Examples of the present disclosure may include methods, systems, and computer readable media with executable instructions, and/or logic. According to one or more examples of the present disclosure, an example method of clothing search in images can include characterizing clothing within a plurality of reference images using a processor, and characterizing clothing within a query image using a processor. A number of the plurality of reference images having clothing with similar color features as clothing of the query image is identified using a processor. A subset of the identified number of the plurality of reference images having clothing with predefined non-color attributes as clothing of the query image are selected using a processor.

As used herein, the term "includes" means includes but not limited to, the term "including" means including but not limited to. The term "based on" means based at least in part on.

This disclosure provides an automatic and novel framework for a clothing visual search of images. The construction of a visual codebook captures the major patterns among local appearance of clothing worn by a person in an image. The method for clothing search in images of the present disclosure performs better with different clothing taken under uncontrolled, and thus more realistic, imaging conditions. The method for clothing search in images can be integrated with face recognition, so as to significantly increase the rate of face recognition. Also, method for clothing search in images can be integrated with face recognition, so as to significantly increase the rate of clothing recognition. That is, matching clothing in addition to, or in lieu of, matching facial features can, in certain circumstances, provide enhanced matching of faces and/or clothing. In addition, the instant approach relies on face detection to locate the rough position of clothing region. Contextual information can be used with learning techniques for clothing search.

The approach for clothing search in images presented herein takes advantage of other attributes of the clothing (e.g., types, patterns, etc.) in addition to constructing a discriminative color codebook for clothing in images. A new processing framework is also presented to reduce the noises from variations that same clothing can be subjected to in different images (e.g., geometric deformation, occlusion, size, background, photometric variability from illumination and pose, etc.) that can be problematic for other techniques, including clothes segmentation, skin elimination, and dominant color extraction.

Visual search of clothing being worn in photo collections, due to its vast applications from automatic person identification to electronic commerce of clothes, is a very active topic in computer vision research. It also can be a challenge due to high variability in clothes appearance such as viewpoint changes, geometric deformation and partial occlusion, as well as variations of the environment, including lighting conditions, and cluttered background. The same clothes in two different images can have obvious differences in appearance due to all the variations. Therefore, such variations are the major factors affecting the performance of visual search methods. While clothing modeling and human recognition using clothes as contextual information have been studied reasonably well in recent years, previous approaches do not explicitly and efficiently deal with the variations in images such as personal photos.

The traditional technique for visual search is content based image retrieval (CBIR), in which images are usually represented by the low level features (e.g., color, texture, and shape). There are two types of features, local features and global features. One previous approach uses the global features (e.g., correlogram features) to model clothing color. Like the other global features, this previous approach can accommodate minor variances such as small occlusions, deformations, and viewpoint changes. However, this previous approach can suffer from illumination variation.

Figure 1:
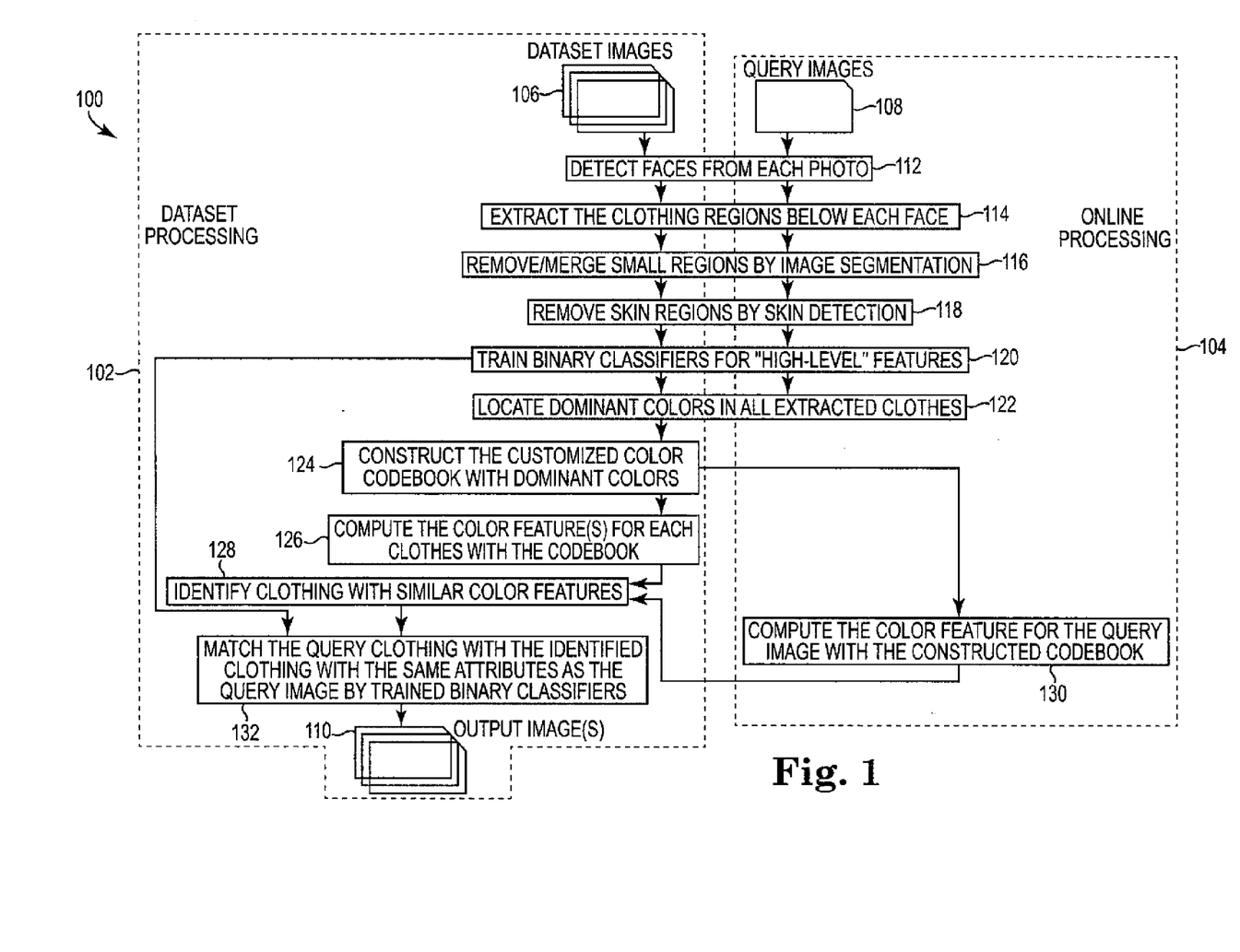
FIG. 1 illustrates a flow chart of a method for clothing search in images according to one or more examples of the present disclosure.

According to one or more examples of the present disclosure, various methods for clothing search in images take advantage of both global features and local features to address the issues associated with previous approaches to visual clothing search methods. FIG. 1 illustrates a flow chart of a method for clothing search in images according to one or more examples of the present disclosure. The method for searching clothing in images 100 of the present disclosure can be used to search for the same clothes from photos. According to some examples, a query image 108 (e.g., photo, video frame) can be used as input for the search where the image contains the clothing of interest. The output can be a list of images 110 of the dataset of images 106 (e.g., dataset photos) containing the same clothing as the query photo 108.

Processing 102 of the dataset images 106 can occur at a same, or different, time than the online processing 104 of the query image 108. For example, the dataset images 106 can be characterized in whole or in part before online processing of the query image 108 as part of a search of the dataset images 106. That is, some portion of the dataset processing can occur offline, such as activities leading up to and/or associated with construction of the customized color codebook can be accomplished offline (e.g., prior to online processing of a query image. Alternatively, dataset processing 102 can occur at the same time as, or even after, online processing of the query image. FIG. 1 indicates one possible division between the timing of activities associated with the method for clothing search in images. However, examples of the present disclosure are not so limited, and activities comprising the present methods may occur as appropriate to the application of the method.

A face detector can be applied to the dataset images 106, and the query image 108, for example, to detect a face in a respective image, as shown at 112 in FIG. 1. The face can be used as a reference location from which to orient a particular article of clothing in the image. However, one or more other body features may be used, individually or collectively, as a reference location in an image from which a location of clothing may be determined. That is, a limb might be detected instead of a face for certain searches. For example, an arm may be first-detected in a search for gloves, or a leg may be first-detected in a search for shoes.

Other body features may also be used as the reference location, such as hair, teeth, hands, feet, etc. Also, a second body feature may be determined from a first body feature, with the clothing location being determined from the second body feature. For example, a face may be detected first, and an arm may be determined based on the first-detected face, and a glove location can be determined with respect to a location of the arm. However, face detection is mature and reliable and is used in this discussion in example. False detection may be reduced by a skin validation module, or other technique.

Once the face is detected and located, a clothing region can be localized and extracted under a pictorial structure. According to one implementation of the present disclosure, a clothing region below each face can be extracted, as shown at 114 in FIG. 1. The clothing region can be, but need not be, limited to the shape of clothing, and can include other portions of the image than clothing, such as limbs, background, etc. For example, the clothing region can be defined by a bounding box based on relative position from, and/or scale of, the detected face. That is, the size and proportions of the bounding box can be set based on (e.g., proportionally to) the size and proportion of the detected face. Other closed geometric configurations can be used to define the clothing region, such as a polygon.

According to one or more examples, the clothing region can be sized and/or located so as to contain the upper body, shoulder, arms, and some portion of background (e.g., portions of the image that are not part of the person or their clothing). Image segmentation can be performed on the extracted clothing regions to eliminate and/or merge interferences from background, and/or illumination, wrinkling, and/or folding of the clothing. Small regions of the clothing region (e.g., some portion of the clothing region) can be merged and/or removed by image segmentation, for example, as shown at 116 in FIG. 1. Mean Shift segmentation can be utilized, for example, due to its effectiveness in eliminating wrinkle and illumination, while keeping contour continuity and texture clustering. After segmentation, the small regions can be removed or merged into nearby regions, since these inconsistent segments usually correspond to background clutter, shadow, and non-dominant areas.

Skin regions within the clothing region can be removed by skin detection techniques, as shown at 118 in FIG. 1. That is, human skin can be removed from the clothing region, as skin can be considered clutter with respect to identifying the clothing.

According to one or more examples of the present disclosure, skin can be removed as follows. Detected faces of the image can be transferred from the RGB color space to the YCbCr color space. The ranges in the channels of Cb and Cr can be computed. If the values of Cb and Cr channels for a pixel from the segmented clothing of the clothing region are in the computed ranges, the pixel can be taken as skin and set to the background, or some predefined color indicative of not being clothing. Segmented clothing can refer to non-background portions of the clothing region.

The skin detector can be based on the observation that the skin tone from a person's face is usually similar to the skin tone of arms and the neck, which are most likely to be included in the bounding box defining the clothing region of the image. However, examples of the present disclosure are not limited to the following skin removal technique, and other skin identification techniques may be used. For example, pixel values, or certain portions thereof, may be compared to a palette of pre-defined colors associated with various skin colors.

After skin regions are removed, dominant colors can be located in some or all extracted clothes, as shown at 122 in FIG. 1. Deformation of clothing can result in false edges and self-shadows that can pose difficulty for shape-based features, like orientation histograms. In addition, most clothes have smooth color regions without textures, which increase difficulties for texture-based features. Moreover, a global feature, such as color histogram, can suffer from the illumination variation. One effective feature representation to solve these problems is to use color visual words.

In each of various regions of the segmented clothing, a small patch (e.g., 7×7 pixels, 8×8 pixels) can be extracted as a sample. In this manner, multiple patches can be obtained from each of the plurality of dataset images. That is, a large set of color samples can be obtained from different clothes on different people from different images. A visual codebook can be constructed by integrating all the extracted samples from the dataset and removing the samples with the similar colors. The constructed codebook is pre-trained for the particular purpose of matching clothing colors. As such, the constructed codebook is a customized color codebook.

Each segmented article of clothing can be mapped to the customized color codebook, its color feature(s) can be represented by the frequency histogram over the customized color codebook. In this manner the customized color codebook can be constructed with dominant colors, as shown at 124 in FIG. 1. From the customized color codebook constructed with dominant colors, the color feature for one or more articles of clothing in a dataset image can be computed with the codebook, as shown in FIG. 1 at 126, and for the query image as shown at 130 of FIG. 1.

Color information (e.g., computed color features) can be used to refine search for images having the same clothing as the query image. The query image can be preprocessed with activities described above, including detection of faces from each photo, extraction of the clothing regions located relative to a body feature (e.g., below a face), removal/merger of small regions by image segmentation, and removal of skin regions by skin detection. After the above-mentioned preprocessing, the color feature(s) for the query image can be computed based on the constructed customized codebook, as shown at 130.

The differences (e.g., vector "distances") between the color feature(s) of the query image and the color feature(s) of dataset images can be computed, for example, using a Jeffrey diverge distance metric. In this manner, dataset images having clothing of similar (e.g., same) color as the clothing of the query image can be identified, as shown in FIG. 1 at 128.

A Bag-of-(visual)-Words (BoW) representation can be advantageous by clustering a large number of local features. However, clothing is often folded and may easily create non-rigid deformation, false edges, and self-shadows. Occlusion and cluttered backgrounds may also exist in the clothing images, and all of these drawbacks may result in many noisy and non-descriptive visual words in a codebook of clothes. Many detected local features alone may not be stable enough to overcome these problems.

Modeling human clothing is very challenging due to geometric deformation, occlusion, and large photometric variability from pose, illumination, color and texture. In addition, "low-level" features, including Scale-Invariant Feature Transform (SIFT) and Speeded-Up Robust Features (SURF), are sensitive to those changes. Therefore, the system can use "high-level" visual features (including attributes and patterns), in addition to or in lieu of using "low level" visual words. "High level" visual words can include, but are not limited to, types of necklines, collars, sleeves, and stripes, which can be more tolerant of geometric and photometric variations.

A number of binary attribute classifiers can be employed, a respective one being associated with one kind of attribute classification. That is, a binary attribute classifier is used to recognize the presence or absence of a specific attribute. For example, a binary attribute classifier can be a Support Vector Machine (SVM) with an RBF kernel, and trained with a set of positive and negative clothing samples.

Binary classifiers can be trained for "high-level" features, during dataset processing and/or online processing, as shown in FIG. 1 at 120. The binary classifiers can be trained for each image (e.g., dataset images and/or query image) such that the binary classifiers represent information classifying a number of predefined non-color clothing attributes of the clothing region. Thereafter, attribute classification can be used to select a subset of the dataset images that were identified as having clothing with the same color feature(s) as the query image, as shown in FIG. 1 at 132. In this manner, the clothing in the query image can be matched (based on non-color attributes) with the clothing in the dataset images previously identified as having clothing with similar color feature(s) to generate a portion of the dataset images 106 as output images 110. For example, the search result can be returned by ranking the color distance in order, or by other technique involving the color feature(s) and/or non-color attributes.

According to various examples, images are identified from the dataset images based on similar color feature(s). The identified images are further refined based on non-color attributes such that a subset of the identified images are selected and presented as matches. However, examples of the present disclosure are not so limited, and non-color attributes can initially be used to initially identify images from the dataset, which are further refined based on color feature(s).

Also, the technique of the present disclosure is not strictly limited to use of binary classifiers, and use of other classifiers such as multi-level classifiers and/or other means for measuring various attributes that can subsequently be used for comparison are contemplated.

FIGS. 2A-2G illustrate a pictorial flow of a method for clothing search in images according to one or more examples of the present disclosure. FIGS. 2A-2G outline a visual processing pipeline. Images in a dataset (e.g., one or more reference images), or for a query image, are generically referred to in the following discussion as an image. An image may be one of a plurality of reference images or a query image. Images can include people wearing one or more articles of clothing. As used herein, clothing refers to underclothing, clothes for a male and/or a female, outerwear, hats, and footwear in any style, size, or other configuration.

Figure 2A:
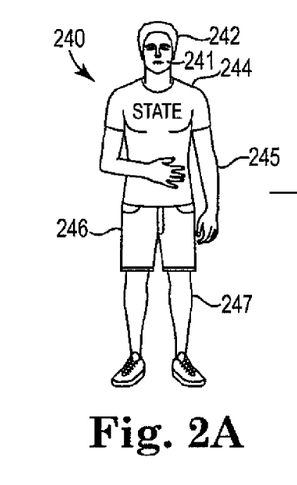
FIGS. 2A-2G illustrate a pictorial flow of a method for clothing search in images according to one or more examples of the present disclosure.

Often the clothing is being worn by a person who is a subject of the image, such as the person image 240 shown in FIG. 2A. The person image 240 can include one or more body features, such as a face 241, or a limb (e.g., an arm 245 and/or a leg 247). However, examples of the present disclosure are not so limited, and other body features may be used as a reference location of the person, such as a hand, nose, ears, feet, etc. The person may be wearing different types of attire, such as a shirt 244, pants 246, and/or other clothing such as a dress, coat, hat, gloves or mittens, shoes, socks, boots, and accessories such glasses, jewelry, a purse and the like.

When search for clothing matches between images, it is helpful to know where the clothing is located in a particular image. Precise clothing extraction is not necessary for a visual clothing search. Instead according to the method for clothing search in images of the present disclosure, approximate areas in which clothing may be located can be obtained, from which interferences can be removed that contribute to a cluttered background and occlusion.

Figure 2B:
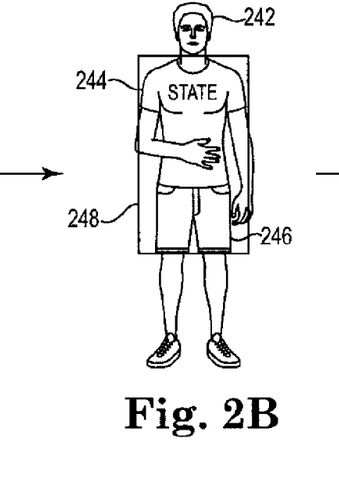

For a respective image (e.g., each image in a dataset and/or the query image), a face detection technique can be used to detect one or more faces in the image. Face detection techniques can also be used to estimate facial proportions such as the eye positions. Once one or more faces are detected and located, the position and relative scale of each detected face can be used to predict proportions and/or orientation of a bounding box, to be located relative to the face. For example, as shown in FIG. 2B, the bounding box can be located below the head, which is expected to contain the clothes of the upper-body. The bounding box can be automatically (e.g., without human intervention) located adjacent to and immediately below a location of the face 241, as may be detected in the image.

The width and height of the bounding box can be set based on absolute and/or relative measurements of the detected face. According to some examples, the bounding box defining the clothing region 248 can be set to be 2.6 times the face width, and the height of the bounding box can be set to 3.0 times the face height. In this manner of locating and sizing the bounding box defining a clothing region of an image, the clothing position can be crudely located based on a body feature (e.g., face) detection.

Figure 2C:
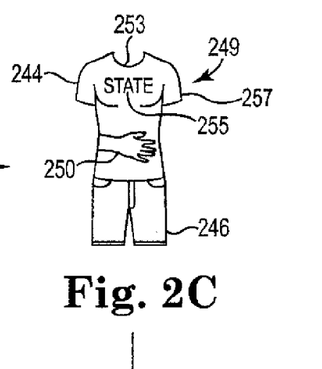

The bounding box can be used as the initial estimation of the clothing location. However, it often contains other content such as hair and skin, occlusion from another person or objects, and cluttered background. Therefore, the Grabcut method can be employed for segmenting the clothes in each photo, as shown in FIG. 2C. The Grabcut method can enhance the extracted clothes quality by removing the influences from the cluttered background and occlusions. The Grabcut method seeks the binary labeling f over the superpixels that minimizes the energy using graph cuts. The energy function is defined with two terms as follows:

$$E(f) = \sum_{s \in p} D_s(f_s) + \sum_{s,t \in N} V_{s,t}(f_s, f_t)$$

where $D_s(f_s)$ represents the data cost of assigning the $s^{th}$ superpixel to label $f_s$, and $V_{s,t}(f_s, f_t)$ denotes the smoothness cost of assigning superpixels s and t in a neighborhood N to respective labels $f_s$ and $f_t$. Possible labels for each pixel are $f_s \in \{0,1\}$ where the index 0 corresponds to background and 1 corresponds to foreground.

Instead of a manual interface to indicate a clothing region, the extracted bounding box can be used to initialize the Grabcut method. FIG. 2C shows an example of applying the Grabcut method for clothes segmentation. The results demonstrate that the Grabcut method can be quite effective in eliminating occlusion and background.

FIG. 2C shows the clothing region extracted and segmented from the balance of the image and the clothing segmented from the background and certain imperfections. Techniques of clothes segmentation can be employed to eliminate noisy pixels in images from background, external features captured within the clothing region defined by the bounding box, and variations in the clothing. The segmented clothing 149 is shown in FIG. 2C.

The segmented clothing can be characterized according to one or more binary classifiers as previously described. For example, clothing features such as neckline 253 (or collar type), presence (or absence) of wording 255, sleeve length 255, and/or other "high level" attributes can be ascertained, and one or more corresponding binary classifiers trained. The trained binary classifiers can be used as described with respect to FIG. 1.

Figure 2D:
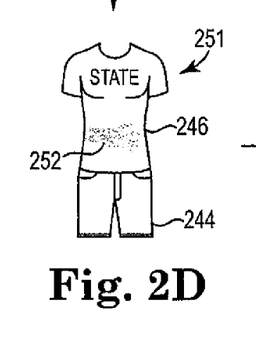

Techniques of skin detection can be employed to remove skin-colored regions from the segmented clothing and/or clothing region. As can be seen in FIG. 2A, a hand and portion of an arm is located over a portion of the shirt 244, included in the clothing region 248 as defined by the bounding box as shown by FIG. 2B, and skin-colored region 250 of the hand and portion of the arm is still visible in the segmented clothing 249 shown in FIG. 2C. FIG. 2D shows the "removed" skin-colored region 252 achieved by pixel-level detection and replacement of skin colors within the segmented clothing 249. As used here, pixels of the "removed" skin-colored region 252 can be set to a background color (e.g., same as color outside segmented clothing 249) or can be set to a color deemed not to represent clothing. As such, segmented clothing 251 excludes any skin-colored regions (e.g., 250 in FIG. 2C).

Skin-colored regions can be eliminated with a skin detector. Approaches with fixed thresholds have been successfully applied to discriminate skin pixels and non-skin pixels in color images. However, skin colors vary greatly among different human races or due to lighting changes. Therefore methods with fixed threshold values may fail in uncontrolled imaging conditions.

As such, various examples of the present disclosure can use a dynamic threshold approach for skin detection, which learns the skin-color threshold from the color information of body features, such as a face region, of an image. The dynamic threshold skin-color method assumes that the face and body of one person are substantially a same color. The dynamic threshold skin-color method of the present disclosure excludes the non-smooth regions (e.g., eyes and mouths etc.) to obtain color information from the smooth regions on the face. Two dynamic threshold values are estimated by fitting a normal distribution on the smooth face region. Based on these values, other skin pixels can be accurately eliminated from the extracted clothes as shown in FIG. 2D at 152.

Figure 2E:
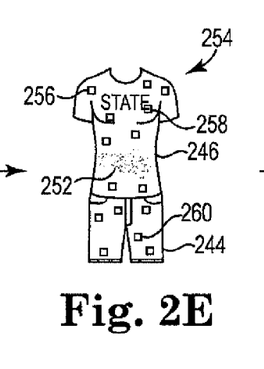

Once skin-color regions are removed, a dominant color (DC) can be determined from color samples obtained from the clothing region (e.g., the segmented clothing 251 shown in FIG. 2D). The color samples can be obtained by extracting patches from various scattered areas across the segmented clothing 251. FIG. 2E shows segmented clothing 254 having a plurality of example locations of color samples. For example, the color samples can include one or more upper color samples 256 that can be obtained from an upper portion of the segmented clothing 254, the upper portion of the segmented clothing 254 being above the waist and likely to represent a shirt.

The color samples can also include one or more lower color samples 260 that can be obtained from a lower portion of the segmented clothing 254, the lower portion of the segmented clothing 254 being below the waist and likely to represent pants. The color samples can include one or more color samples 258 that may include portions of some clothing detail, such as the lettering 255 shown in FIG. 2C. Dominant colors (DCs) can be determined from the color samples, as previously described above.

According to various examples of the present disclosure, a dominant Color Patch Extraction technique can be used to determine dominant colors. For example, the SIFT approach and its variations can be used as local image descriptors. However, SIFT-based descriptors are not invariant to general deformations, and they may not perform well if the clothing under consideration has only plain region without textures or patterns. To increase illumination invariance and discriminative power, color descriptors can be used that are robust against certain photometric changes such as C-SIFT, RGB-SIFT, Opponent-SIFT, etc. However, these descriptors may still suffer from deformation. A more powerful clothing descriptor can be based on dominant color (DC) samples (e.g., patches). DC can be robust against internal and external variations of clothing to some extent.

According to some examples, extracting DC patches from clothing images can be performed as follows. A 3D histogram can be generated in the RGB color space with 16 bins on each axis for each article of clothing. The colors in the same bin can be assumed to be similar, and the centroid of each bin can be selected as its quantized color, denoted as $c_i = (x_i^R, x_i^G, x_i^B)$.

The quantized colors of bins can be selected with $M_i/M > r$ as DCs, where $M_i$ is the number of pixels in the $i^{th}$ bin, $M$ is the number of all pixels in the image, and $r$ is the predefined threshold (e.g., $r=0.008$). The DC is denoted as $\{(x_{(dc,j)}^R, x_{(dc,j)}^G, x_{(dc,j)}^B)\}_{j=1}^K$, where K is the number of DCs.

The clothing image can be divided into 7×7 non-overlapping patches, for example. However, examples of the present disclosure are not so limited and other patch dimensions can be used. For the non-overlapping patches, select a patch p as one candidate of dominant color patches for DC j, if $|\bar{x}_p^R - x_{(dc,j)}^R| < T_R$ and $|\bar{x}_p^G - x_{(dc,j)}^G| < T_G$ and $|\bar{x}_p^B - x_{(dc,j)}^B| < T_B$, where $(\bar{x}_p^R, \bar{x}_p^G, \bar{x}_p^B)$ is the mean color of patch p, $T_R$, $T_G$, and $T_B$ are thresholds in R, G, B components respectively, and $1 \leq j \leq K$ (e.g., $T_R = T_G = T_B = 2$).

The candidate patches can be sorted for each DC j in order by the number of pixels (in the patch) whose colors are close to $\{(x_{(dc,j)}^R, x_{(dc,j)}^G, x_{(dc,j)}^B)\}_{j=1}^K$. For example, $\gamma$ (e.g., $\gamma \leq 10$) patches can be selected as DC patches for each DC j of an article of clothing. An illumination normalization can be performed on each DC patch using (R/(R+G+B), G/(R+G+B), B/(R+G+B)).

Even with the above-describe activities applied to the images, it is possible that all the regions that are left may not belong to an article of clothing. Moreover, the extracted clothing region may include various decoration(s), wrinkle(s), fold(s), and/or shading, which can cause interference on a visual search. Therefore, a BoW representation can be used to increase tolerance of these variations. To do that, DC patches from all of the clothing in the dataset can be collected together to form a data matrix $Y_i=(y_1, \ldots, y_N) \in R^{D \times N}$, where $y_i \in R^D$ ($i=1, \ldots, N$) is the D-dimensional DC patches. For 7×7 pixel patches, D is equal to 147 (7×7×3). K-means clustering can be run on Y to obtain the clothing codebook, which contains k codewords. That is, the clothing codebook contains the number of clusters for K-means.

In the following discussion, the method of clothing search in images of the present disclosure is discussed with respect to performance with different values of k in the experiments discussed below. A 2-level vector quantization, pixel-based and patch-based, can be performed on each article of clothing after preprocessing. The articles of clothing are quantized in pixel level using the color map from the codebook. Patch-based quantization is performed with the generated codebook. More particularly, the quantized clothing can be divided with pixel level into 7×7 patches, for example, with each patch being mapped into its nearest codeword after illumination normalization. Therefore, by mapping the clothing patches to the codewords, each article of clothing can be represented by the k-dimensional frequency histogram over the codebook.

The k-dimensional frequency histogram over the codebook can be expressed as $$H = [h_1, \ldots, h_k] \text{ with } h_i = n_i / \sum_{j=1}^{k} n_j,$$

where $n_i$ is the number of occurrence of codeword i in a particular article of clothing.

This clothing representation can present advantages that include: being more invariant to illumination changes that is gained through the techniques of vector quantization and local illumination correction; being more robust to foreground occlusion, background clutters, and pose variation achieved by application of a skin elimination technique and via clothing segmentation and the use of DC patches to reduce the interferences from these variations; having more discrimination in the codebook, achieved through preprocessing techniques to reduce noisy and non-descriptive codewords. Furthermore, both color and texture information are used together to construct the codebook (since color evaluated only for those clothing images having the same attributes as the query image, as determined by trained binary classifiers).

Similarity measurement can be used to define a measure of similarity between the codeword histogram of the $j^{th}$ article of clothing $H_j^p$ from the dataset and the histogram of the query clothes $H^q$. According to one or more examples of the present disclosure, the Jeffrey Divergence is adopted as follows:

$$D(H^{(p,j)}, H^q) = KL(H^{(p,j)} \| (H^{(p,j)} + H^q)/2) + KL(H^q \| (H^{(p,j)} + H^q)/2)$$

$$KL(H^{(p,j)} \| H^q) = \sum_{i=1}^{k} \left( h_i^{(p,j)} \log \frac{h_i^{(p,j)}}{m_i} + h_i^q \log \frac{h_i^q}{m_i} \right),$$

where KL is Kullback-Leibler divergence, and $m_i = (h_i^{(p,j)} + h_i^q)/2$. The Jeffrey Divergence, in contrast to Kullback-Leibler divergence, is numerically stable and symmetric.

Figure 2F:
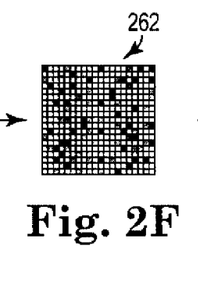
Figure 2G:
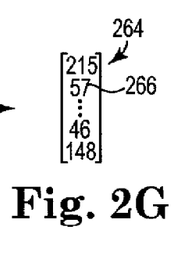

FIG. 2F represents a personal codebook 262 (e.g., visual codebook) that can be constructed by quantizing the DCs (determined from the color samples) into clusters using an unsupervised clustering algorithm such as K-means. The cluster centers are called codewords 264, as shown in FIG. 2G. The codewords 264 have a quantity of elements 266 corresponding to the DCs. The codewords 264 are numerated in the visual codebook 262. Given certain clothes, its appearance can be represented by a frequency histogram over the codebook.

According to the efficient visual codebook generation scheme of the present disclosure, the most representative color samples (e.g., patches) to build the codebook are selected instead of using all the clothes patches in the dataset. Representative color samples are used because some patches, such as patches from the background clutter, can introduce unwanted noise and non-descriptive visual codewords. Moreover, dominant color patch representations characterize the appearance of clothing limited to a few principle colors, which can provide robustness to the internal and external clothes variations to some extent. Also, working on a patch level has an additional advantage in that it is easier to compensate for illumination variation locally. Therefore, a DC extraction technique, based on representative color samples, can be used to capture the major patterns of clothing.

Furthermore, an automatic (i.e., without human intervention) processing framework according to the present disclosure can reduce the interferences in the visual codebook construction from a number of variations (previously enumerated). In general, the method for clothing search in images is particularly capable in handling clothing with large appearance changes than previous approaches.

The method for selecting clothing in images of the present disclosure was tested on the CMU database with 931 clothing images from 32 subjects. The experimental results showed that the method of the present disclosure is more efficient in discriminating different clothing than other previous approach image descriptors. The CMU dataset contains 589 images, in which 931 faces with 32 identities are labeled. The classes of clothing were labeled corresponding to these faces to evaluate clothing retrieval. The data include a variety of scenes such as sports event and family parties. The performance metrics were based on the proportion of the relevant materials actually retrieved. For each query clothing image, the set of ground truth images was defined as the images of the dataset that contain the same clothing dressed by the same person. The retrieval performances was evaluated in terms of the average precision rate $PR=R_r/R$ and the average recall rate $RC=R_r/R_t$, where $R_r$ is the number of returned images considered that are relevant, $R_t$ is the number of total relevant images in the dataset and R is the number of all returned images. The method for clothes searching in images was tested against 80 visual clothes queries.

The results were that the method for clothes searching in images of the present disclosure achieved an average precision of about 0.38 and an average recall of about 0.63, while the best average precision for another approach was about 0.28 for a HueSIFT method and the best average recall was about 0.45 again for the HueSIFT method. Other previous approach methods tested included C-SIFT, Opponent-SIFT, Color Moments, HSV-SIFT, RGB, RGB-SIFT, rgSIFT, SIFT, and Transformal Color. It should be noted that for these previous approach descriptors, the same clothing extraction, segmentation method, and skin elimination were used before feature extraction. It was demonstrated that the method for clothing search in images of the present disclosure can significantly outperform previous approach descriptors in PR and RC.

In addition, how the performance of the method for clothing search in images of the present disclosure changes when the number of clusters changes in the K-means clustering was investigated. Using the CMU dataset and for a number of clusters in the range of 0 to more than 2,500, the average precision was in the range of about 0.35 to 0.4, and the average recall was in the range of about 0.6 to 0.65 with different values of k. The precision and recall results were relatively flat across the range of cluster quantity. That is, as k varies, there is no obvious change in the performance of the method for clothing search in images of the present disclosure. These tests demonstrate the effectiveness of the visual codebook, which captures the major patterns of clothing in the dataset, and includes very few noisy and non-representative codewords.

Figure 3:
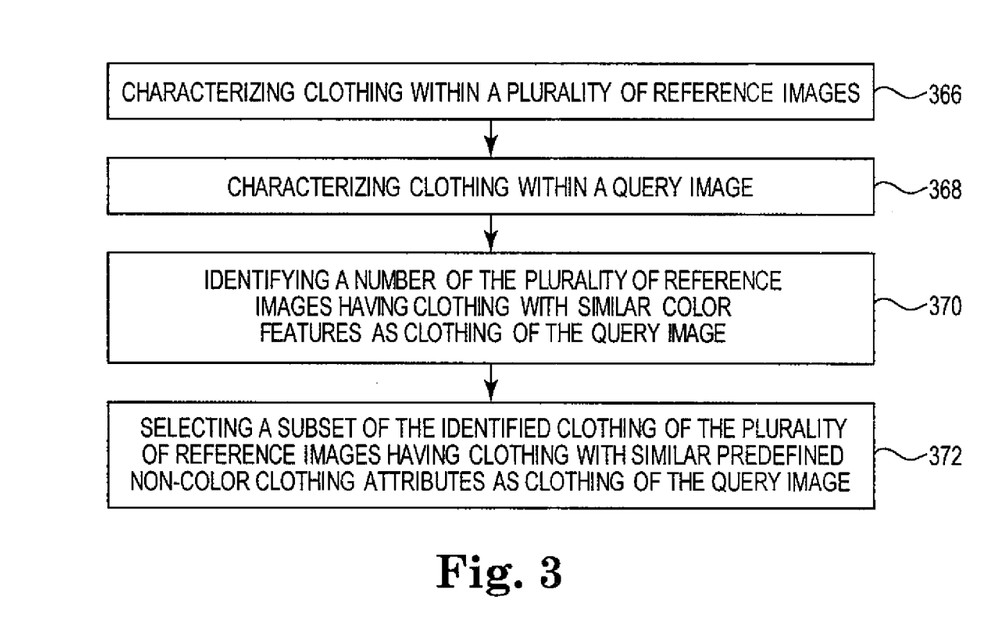
FIG. 3 illustrates a flow chart of a method for clothing search in images according to one or more examples of the present disclosure.

FIG. 3 illustrates a flow chart of a method for clothing search in images according to the present disclosure. Clothing within a plurality of reference images can be characterized, as shown at 366. Clothing within a query image can also be characterized, as shown in FIG. 3 at 368. As shown at 370 in FIG. 3, a number of the plurality of reference images having clothing with similar color features as clothing of the query image is identified. A subset of the identified clothing of the plurality of reference images having predefined non-color attributes as clothing of the query image are selected, as shown in FIG. 3 at 372.

Figure 4:
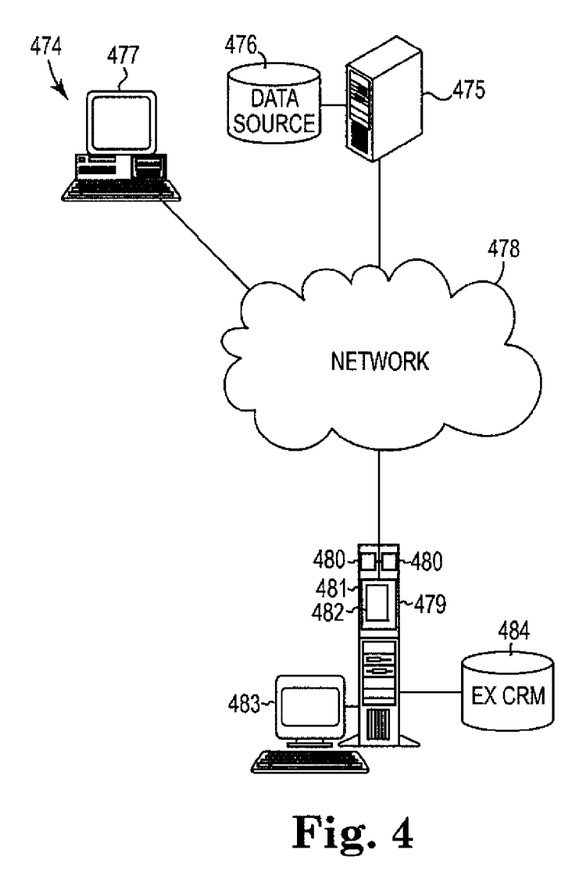
FIG. 4 illustrates a block diagram of an example computing system used to implement a clothes searching in images system according to the present disclosure.

FIG. 4 illustrates a block diagram of an example computing system used to implement a clothes searching in images system according to the present disclosure. The computing system 474 can be comprised of a number of computing resources communicatively coupled to the network 478. FIG. 4 shows a first computing device 475 that may also have an associated data source 476, and may have one or more input/output devices (e.g., keyboard, electronic display). A second computing device 479 is also shown in FIG. 4 being communicatively coupled to the network 478, such that executable instructions may be communicated through the network between the first and second computing devices.

Second computing device 479 may include one or more processors 480 communicatively coupled to a non-transitory computer-readable medium 481. The non-transitory computer-readable medium 481 may be structured to store executable instructions 482 (e.g., one or more programs) that can be executed by the one or more processors 480 and/or data. The second computing device 479 may be further communicatively coupled to a production device 483 (e.g., electronic display, printer, etc.). Second computing device 479 can also be communicatively coupled to an external computer-readable memory 484. The second computing device 479 can cause an output to the production device 483, for example, as a result of executing instructions of one or more programs stored on non-transitory computer-readable medium 481, by the at least one processor 480, to implement a system for incremental image clustering according to the present disclosure. Causing an output can include, but is not limited to, displaying text and images to an electronic display and/or printing text and images to a tangible medium (e.g., paper). Executable instructions to implement incremental image clustering may be executed by the first computing device 475 and/or second computing device 479, stored in a database such as may be maintained in external computer-readable memory 484, output to production device 483, and/or printed to a tangible medium.

One or more additional computers 477 may also be communicatively coupled to the network 478 via a communication link that includes a wired and/or wireless portion. The computing system can be comprised of additional multiple interconnected computing devices, such as server devices and/or clients. Each computing device can include control circuitry such as a processor, a state machine, application specific integrated circuit (ASIC), controller, and/or similar machine.

The control circuitry can have a structure that provides a given functionality, and/or execute computer-readable instructions that are stored on a non-transitory computer-readable medium (e.g., 476, 481, 484). The non-transitory computer-readable medium can be integral (e.g., 481), or communicatively coupled (e.g., 476, 484) to the respective computing device (e.g. 475, 479) in either a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium 330 can have computer-readable instructions stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), Blu-ray discs, compact discs (CD), laser discs, and magnetic media such as tape drives, floppy discs, and hard drives, solid state media such as flash memory, EEPROM, phase change random access memory (PCRAM), as well as other types of machine-readable media.

Logic can be used to implement the method(s) of the present disclosure, in whole or part. Logic can be implemented using appropriately configured hardware and/or machine readable instructions (including software). The above-mention logic portions may be discretely implemented and/or implemented in a common arrangement.

Figure 5:
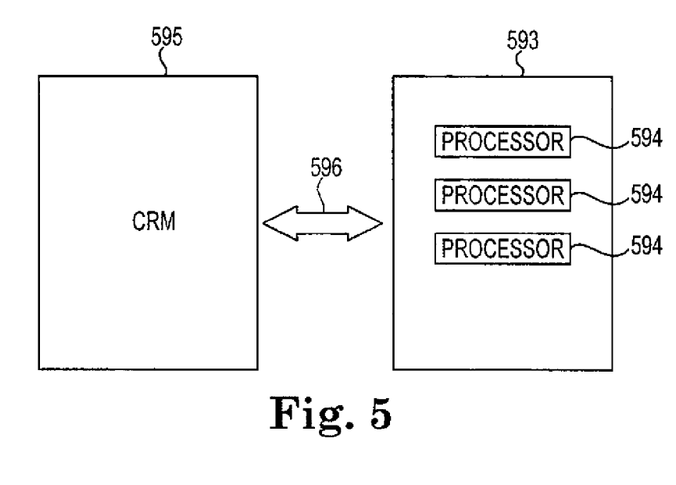
FIG. 5 illustrates a block diagram of an example computer readable medium (CRM) in communication with processing resources according to the present disclosure.

FIG. 5 illustrates a block diagram of an example computer readable medium (CRM) 595 in communication, e.g., via a communication path 596, with processing resources 593 according to the present disclosure. As used herein, processor resources 593 can include one or a plurality of processors 594 such as in a parallel processing arrangement. A computing device having processor resources can be in communication with, and/or receive a tangible non-transitory computer readable medium (CRM) 595 storing a set of computer readable instructions (e.g., software) for capturing and/or replaying network traffic, as described herein.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples provided herein. The above description has been made in an illustrative fashion, and not a restrictive one. Combination of the above examples, and other examples not specifically described herein will be apparent upon reviewing the above description. Therefore, the scope of one or more examples of the present disclosure should be determined based on the appended claims, along with the full range of equivalents that are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." "Embodiment," as used herein, does not necessarily refer to the same embodiment, although it may.

In the foregoing discussion of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of this disclosure.

Some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed example. The following claims are hereby incorporated into the Detailed Description, with each claim standing on its own.

What is claimed:

1. A method for clothing search in images, comprising:
   characterizing, using a processor, clothing within a plurality of reference images;
   characterizing, using a processor, clothing within a query image;
   identifying, using a processor, a first subset of the plurality of reference images having clothing with similar color features as clothing of the query image; and
   selecting, using a processor, a second subset derived from the identified first subset of the plurality of reference images, the second subset including those plurality of reference images having clothing with similar predefined clothing attributes other than color as clothing of the query image.

2. The method of claim 1, further comprising constructing, using a processor, a customized color codebook based on the plurality of reference images, wherein characterizing clothing includes
   detecting a body feature in an image;
   extracting a clothing region relative to the body feature;
   removing skin-colored regions from the clothing region;
   classifying a number of predefined clothing attributes other than color of the clothing region; and
   determining a dominant color feature associated with the clothing region.

3. The method of claim 2, wherein constructing a customized color codebook includes:
   obtaining a plurality of color samples from across the clothing regions extracted from the plurality of reference images; and
   identifying dominant colors for the extracted clothing regions based on the plurality of color samples.

4. The method of claim 3, wherein constructing a customized color codebook for the clothing region includes:
   extracting a number of dominant color 7×7 pixel non-overlapping patches from segmented clothing; and
   performing illumination normalization on each dominant color patch.

5. The method of claim 2, wherein detecting the body feature includes detecting a face.

6. The method of claim 2, wherein detecting the body feature includes detecting a limb.

7. The method of claim 2, wherein removing skin-colored regions from the clothing region includes applying a dynamic threshold to determine skin color, the dynamic threshold being determined from the body feature.

8. The method of claim 2, wherein extracting the clothing region relative to the body feature includes extracting a bounding box adjacent to and located immediately below the body feature.

9. The method of claim 8, wherein detecting the body feature includes detecting a face, and the bounding box width is based on a width of the face, and the bounding box height is based on the height of the face.

10. The method of claim 8, wherein extracting the clothing region includes segmenting clothing according to a Grabcut method, the bounding box being used to initialize the Grabcut method.

11. The method of claim 2, further comprising:
    training, using a processor, binary classifiers with the predefined clothing attributes other than color of the query image; and
    computing, using a processor, one or more similar color features for each clothing of the plurality of reference images and query image with a customized color codebook,
    wherein selecting the second subset of the identified first subset of the plurality of reference images having clothing with similar predefined clothing attributes other than color as clothing of the query image includes selecting clothing with the trained binary classifiers and matching clothing in the query image with the identified clothing from the plurality of reference images using the computed one or more similar color features.

12. The method of claim 1, wherein identifying the first subset of the plurality of reference images having clothing with similar color features as clothing of the query image includes measuring color similarity using a Jeffrey Divergence.

13. A non-transitory computer-readable medium having computer-executable instructions stored thereon, the computer-executable instructions comprising instructions that, if executed by one or more processors, cause the one or more processors to:
    receive a query image;
    construct a customized color codebook based on a plurality of reference images;

characterize clothing within the plurality of reference images for predefined clothing attributes other than color and one or more color features associated with the constructed customized color codebook;

characterize clothing within the query image for predefined clothing attributes other than color and one or more color features associated with the constructed customized color codebook;

identify a number of the plurality of reference images having clothing with similar color features as clothing of the query image; and select a subset of the identified number of the plurality of reference images having clothing with similar predefined clothing attributes other than color as clothing of the query image.

14. The non-transitory computer-readable medium of claim 13, further comprising instructions that, if executed by one or more processors, cause the one or more processors to:

for each of the plurality of reference images and the query image:

detect a body feature in an image;

extract a clothing region relative to the body feature;

remove skin-colored regions from the clothing region;

classify a number of predefined clothing attributes other than color of the clothing region; and determine one or more color features associated with the clothing region.

15. A computing system, comprising:

a non-transitory computer-readable medium having computer-executable instructions stored thereon; and a processor coupled to the non-transitory computer-readable medium, wherein the processor executes the instructions to:

construct a customized color codebook based on a plurality of reference images;

characterize clothing within the plurality of reference images;

characterize clothing within a query image;

identify a number of the plurality of reference images having clothing with similar color features as clothing of the query image; and select a subset of the identified number of the plurality of reference images having clothing with similar predefined clothing attributes other than color as clothing of the query image, wherein the processor executes the instructions to characterize clothing includes instructions to:

detect a body feature in an image;

extract a clothing region relative to the body feature;

remove skin-colored regions from the clothing region;

classify a number of predefined clothing attributes other than color of the extracted clothing region; and determine color features of the extracted clothing region.

* * * * *